United States Patent
Brülle-Drews et al.

(10) Patent No.: US 7,321,823 B2
(45) Date of Patent: Jan. 22, 2008

(54) UNMAPPED TERRAIN NAVIGATIONAL SYSTEM

(75) Inventors: Christian Brülle-Drews, Hamburg (DE); Hartmut Schirmer, Pinneberg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 155 days.

(21) Appl. No.: 10/844,259

(22) Filed: May 12, 2004

(65) Prior Publication Data

US 2005/0043881 A1   Feb. 24, 2005

(30) Foreign Application Priority Data

May 12, 2003   (EP) ................................. 03010620

(51) Int. Cl.
 *G01C 21/00* (2006.01)
(52) U.S. Cl. ...................... 701/200; 701/207; 701/206; 340/988; 342/457
(58) Field of Classification Search ................ 701/200, 701/207, 206; 340/988; 342/457
See application file for complete search history.

(56) References Cited

U.S. PATENT DOCUMENTS

| | | | |
|---|---|---|---|
| 5,646,855 A * | 7/1997 | Jones et al. ................. | 701/206 |
| 5,799,264 A | 8/1998 | Mizutani et al. | |
| 6,345,250 B1 | 2/2002 | Martin | |
| 6,374,183 B1 * | 4/2002 | Oshida et al. ............. | 701/211 |
| 6,480,785 B1 * | 11/2002 | Joerg et al. ................ | 701/209 |
| 6,741,931 B1 * | 5/2004 | Kohut et al. ............... | 701/209 |
| 6,909,967 B2 * | 6/2005 | Hirano et al. .............. | 701/209 |
| 2003/0028380 A1 | 2/2003 | Freeland et al. | |
| 2003/0060971 A1 * | 3/2003 | Millington et al. ......... | 701/206 |
| 2004/0117246 A1 * | 6/2004 | Applebaum .................. | 705/14 |

FOREIGN PATENT DOCUMENTS

| | | |
|---|---|---|
| DE | 101 46 115 A1 | 4/2003 |
| WO | WO 03/040655 A1 | 5/2003 |

OTHER PUBLICATIONS

Lewis, John R., "In the Eye of the Beholder", IEEE Spectrum, May 2004, pp. 24-28.

* cited by examiner

*Primary Examiner*—Thomas Black
*Assistant Examiner*—Marie A. Weiskopf
(74) *Attorney, Agent, or Firm*—Brinks Hofer Gilson & Lione (57) ABSTRACT

A navigational system provides information on unmapped terrain based on a waypoint positioned between a point of departure and a destination. The navigational system includes position data stored in a memory and communication logic. The position data represents a current position and a waypoint position in an unmapped space. The memory includes navigational information about the waypoint. The communication logic audibly communicates the navigational information to a vehicle operator.

36 Claims, 7 Drawing Sheets

UNMAPPED TERRAIN NAVIGATIONAL SYSTEM

PRIORITY CLAIM

This application claims the benefit of European patent application No. 03 010 620.7, filed May 12, 2003. The disclosure of the above application is incorporated herein by reference.

BACKGROUND OF THE INVENTION

Satellite positioning has made vehicle navigational systems more useful to a broad range of drivers. Through entered destinations, these systems provide graphical routes to destinations. Using digitized information, the navigational systems display a location and a direction on a screen using movable maps to track vehicle progress to destinations.

Some navigational system rely on "map matching" technologies to coordinate destinations and locations. These systems combine satellite positioning technology with road maps to pinpoint exact locations. Because these systems are map based they may require actual maps to route a driver to a desired destination. In areas that are not mapped, some navigational systems provide only limited information that a driver must continuously monitor. These systems may distract a driver that is navigating through changing traffic patterns and changing road conditions.

SUMMARY

This invention provides a navigational system for unmapped terrain. The navigational system may include position data stored in a memory and communication logic. The position data may represent a current position and one or more waypoints in an unmapped space. The memory may include navigational information related to the first path waypoint. The communication logic may audibly relay the navigational information to a vehicle operator.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A mobile navigational system may guide an operator to a destination. The navigational system may process a position and a waypoint to pinpoint a desired location. The system may include an interface that provides the operator with one or more graphics, text, and acoustic (e.g., audio) route descriptions. The route descriptions may be provided incrementally or at a user defined interval.

The navigational system may be incorporated into many different types of systems, such as cars, other motorized vehicles, and personal navigational devices. The systems may be encompassed within many different media such as a program and data stored in a machine readable media that may include memories, disk drives, tape drives and any other information storage and retrieval devices.

Information describing an operator's location and destination may be implemented and processed through logic, circuitry, and other hardware. The circuitry may include a processor such as a microprocessor, a microcontroller, a signal processor, and application specific circuits. Such circuitry may process program instructions stored locally in one or more memories or distributed across several memories across one or more remote locations.

Figure 1:
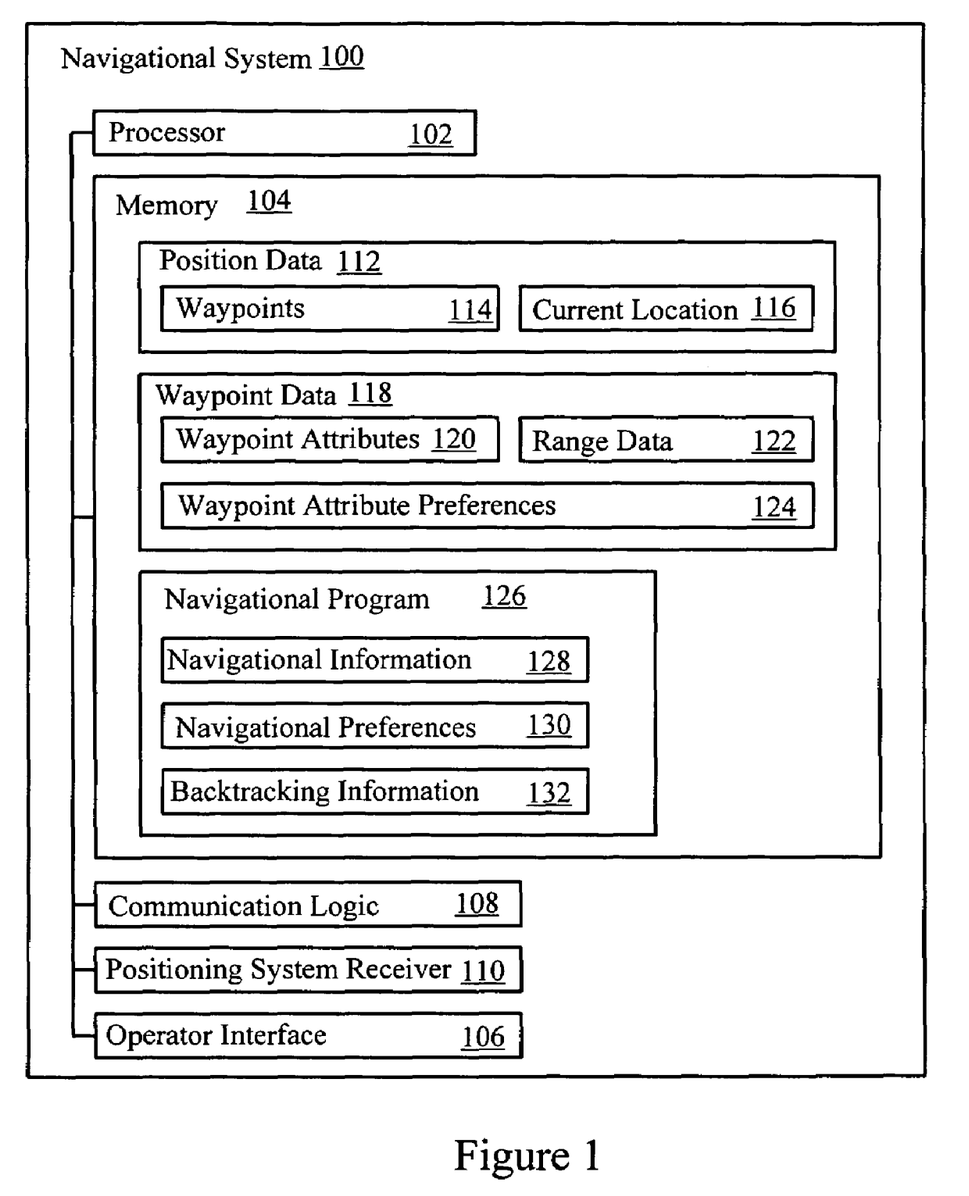
FIG. 1 is an unmapped terrain navigational system.

In FIG. 1, a navigational system 100 includes a processor 102, a memory 104, and an interface 106. The interface 106, shown as an operator interface, allows a user to interact with the navigational system 100. The interface may receive navigational preferences 130 that are retained in the navigational system 100, and may convert and transform a signal into graphics, text, or acoustic output.

The operator interface 106 may include one or more switches, a speech recognition system, or any other input device that receives information from an operator. The navigational system 100 may be linked to the operator interface 106 to accept waypoint positions 114, waypoint attributes 120, and attribute preferences 124.

The navigational system 100 may also accept waypoint positions 114, waypoint attributes 120, and attribute preferences 124 from machine readable media such as CD-ROMs, floppy disks, or memory modules. The machine readable media may store waypoint positions 114, waypoint attributes 120, and attribute preferences 124 for any geographic area. The machine readable media may supplement or replace the waypoint positions 114, waypoint attributes 120, and attribute preferences 124 that an operator enters.

A waypoint position 114 may be established by geographical coordinates such as a latitude or a longitude, or other indicia. A waypoint may represent a location, such as a location of interest which may be a location of a hotel, a gas station, a restaurant, or other service providers. The waypoint position 114 may be located within an unmapped space where digitized road information is not available to the navigational system 100.

An unmapped space may be an area without roads such as a desert, or an open or remote terrain. It also may be a location within a populated area for which no digitized road information is available to the navigational system 100, such as a recently completed road within a city.

The current location 116 may represent the present location of an operator or a vehicle. The current location 116 may be established by geographical coordinates such as a longitude and a latitude, or by other locating indicia. The navigational system 110 may maintain the current location 116 through positioning system signals received periodically, on demand, or according to a schedule from the positioning system receiver 110.

One or more waypoints 114 may represent locations positioned between a point of departure and a destination. A vehicle operator may specify path waypoints before or during the operator's trip. The waypoints may form a linear or non-linear path. One or more waypoints 114 also may form attribute waypoints. Attribute waypoints may represent locations of interest to the operator that may or may not lie on or between an expected path. The attribute waypoints may be located in any unmapped space.

The navigational system 100 may accept operator instructions that establish one or more waypoint attributes 120 and attribute preferences 124. The waypoint attributes 120 may include any characteristic of a location. The waypoint attributes 120 may include the type of service establishment represented by a waypoint (e.g., a restaurant), significant landmarks (e.g., waterfalls, craters, or a canyon), road conditions (e.g., sharp turns), or any other characteristics. The waypoint attribute preferences 124 may be location characteristics selected from the waypoint attributes 120.

The range data 122 may specify one or more distances from one or more waypoints. The distances may be measured by a time, distance, or any other standards of measurement. The time measurement may be an elapsed time to reach a waypoint along a shortest distance (e.g., straight line) path, along a pre-selected path (e.g., a backtracking path), or any other pre-determined or operator defined path. The distance may be a shortest distance from or to a waypoint. When a current location 116 is within a range of a waypoint, the navigational system 100 may convey selected navigational information about that waypoint to an operator.

The navigation program 126 may communicate with a positioning system receiver 110, such as a Global Positioning System (GPS) receiver. The positioning system receiver 110 may process signals to determine time differences between their transmissions and receptions. The time differences may be used to compute latitude, longitude, altitude, time, or other navigational parameters.

The navigation program 126 may receive current location updates directly from the positioning system receiver 110. The navigation program 126 also may receive positioning information from the positioning system receiver 110 and determine coordinate information. The coordinate information may include a current location data 116 or other positioning data. The positioning system receiver 110 may not have GPS capabilities, but may include circuitry or logic that may process other positioning signals.

The navigation program 126 may maintain navigational information 128 in a memory 104. The navigational information 128 may be based on the location data 116 and waypoint location data 114. The navigational information 128 also may reflect the waypoint attribute data 120, attribute preferences 124, or any other data retained in the navigational system 100.

The navigational information 128 may include current position data, including the current location data 116 expressed by a latitude and longitude, or other measures. The navigational information 128 also may include distance data (e.g., number of kilometers), direction data (e.g., a compass bearing) or time data (e.g., absolute time or remaining time) to one or more of the waypoints. The navigational information 128 also may include deviation data expressed in terms of distance, direction, or time that indicates how the vehicle is moving farther in time or space from a waypoint. Attributes of the waypoints also may be included in the navigational information 128.

The navigational system 100 may accept the navigational preferences 130. The navigational preferences 130 also may be pre-stored in the memory 104 to provide default preferences, or read from a machine readable medium. The navigational preferences 130 may specify the navigational information that the operator desires to receive from the navigational system 100.

The navigational preferences 130 may specify the types of navigational information that the navigational system 100 may announce. The navigational preferences 130 may specify the distance remaining until reaching a waypoint, the time remaining until reaching the waypoint, or the direction to the waypoint. The operator also may establish the navigational preferences 130 to indicate that the operator desires to know one or more characteristics of any particular waypoint. Through the navigational preferences 130, the operator may specify the information that the navigational system 100 transfers through the communication logic 108.

The communication logic 108 may include a display, an acoustical device such as an amplifier, speakers, a voice synthesizer, or other sound generating devices. When the communication logic 108 includes a sound system, the navigational system 100 may convey the navigational information 128 acoustically to the operator.

Figure 2:
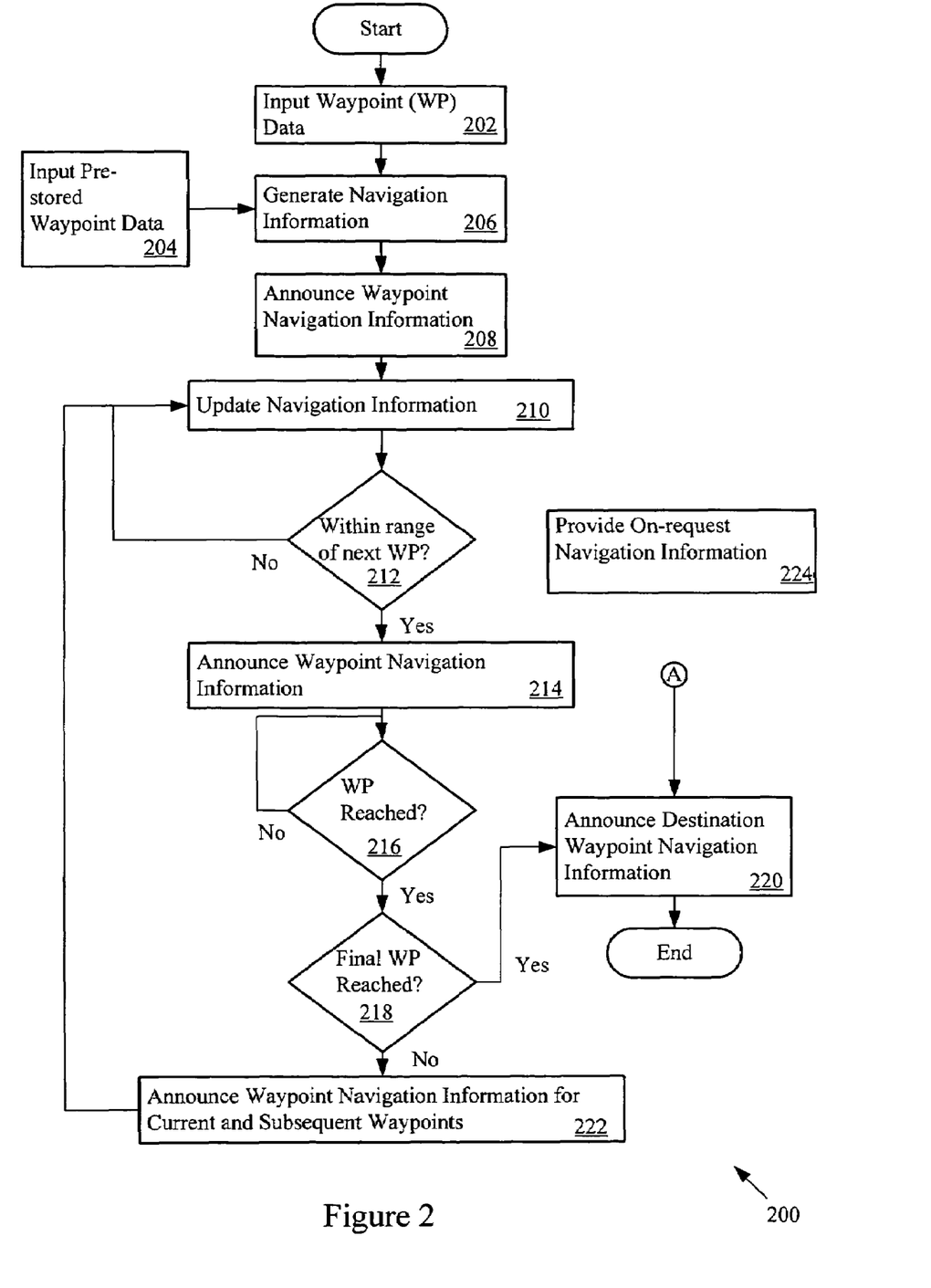
FIG. 2 is a flow diagram of an unmapped terrain navigation.

In FIG. 2, the navigation process begins when the navigation system 100 accepts data to establish waypoint locations 114, waypoint data 118, or navigational preferences 130 (Act 202). The navigational system may accept data from an operator, a machine readable medium, or one or more other sources (Act 204).

The navigational system 100 may generate navigational information 128 (Act 206). The navigational system 100 may process the navigational signals received from the positioning system receiver 110 through a navigational program 126. The navigational information 128 may include the current position of the vehicle, its estimated velocity, its direction, distance from a waypoint, or any other parameter.

The navigational system 100 may communicate navigational information 128, that includes waypoint information about the first waypoint, to an operator (Act 208). The navigational system 100 may inform the operator of a direction, a distance, a time of arrival, or any other navigational parameter related to the first waypoint. The communication logic 108 may convey the navigational information 128 through acoustics, graphics, or text. The navigational information 128 may be based on the navigational preferences 130 retained in a memory 104.

The navigational system 100 may update the navigational information 128 at any time (Act 210). Over time, the navigational system 100 may maintain the current location 116, distances from waypoints, and other navigational parameters. The navigational system 100 may compare the current location 116 against the range data 122 to determine when the vehicle has moved within any waypoint range (Act 212). The range may be expressed through a time, distance, or another measurement.

When the vehicle comes within range of any waypoint, the navigational system 100 may communicate navigational information 128 for that waypoint (Act 214). The communication logic 108 may convey the navigational information 128, or information selected by the operator according to the navigational preferences 130 acoustically or through a viewable media. The acoustic form may include a synthesized voice or other acoustic output.

The navigational system 100 may continue to update the navigational information 128 over time and ascertain whether the vehicle has reached a proximate waypoint (Act 216). The navigational system 100 may also determine whether the proximate waypoint is a final waypoint (Act 218). If the proximate waypoint is a final waypoint, the navigational system 100 may announce that the vehicle has reached the final waypoint (Act 220).

Alternatively, the navigational system 100 may announce that the vehicle has reached the proximate waypoint (Act 222). The navigational system 100 may also announce navigational information for any subsequent waypoint, including the next waypoint. For the next waypoint, the navigational system 100 may announce the direction, distance, estimated time of arrival, other waypoint characteristics, or any other navigational parameters. The navigational system 100 may continue to update the current location 116 and announce navigational information 128 for waypoints as they come into range.

At any time, an operator may request navigational information. The navigational system may wait for and process such requests in addition to performing the actions described above (Act 224). With the system operation described above, the operator may simultaneously receive additional navigational information 128 regardless of the vehicle's current location 116, or its relation to a waypoint. The operator may request navigational information 128 through the operator interface 106, by actuating a key, speaking a command, or by taking any other action interpreted by the navigational system 100 as a request for the navigational information 128.

Figure 3:
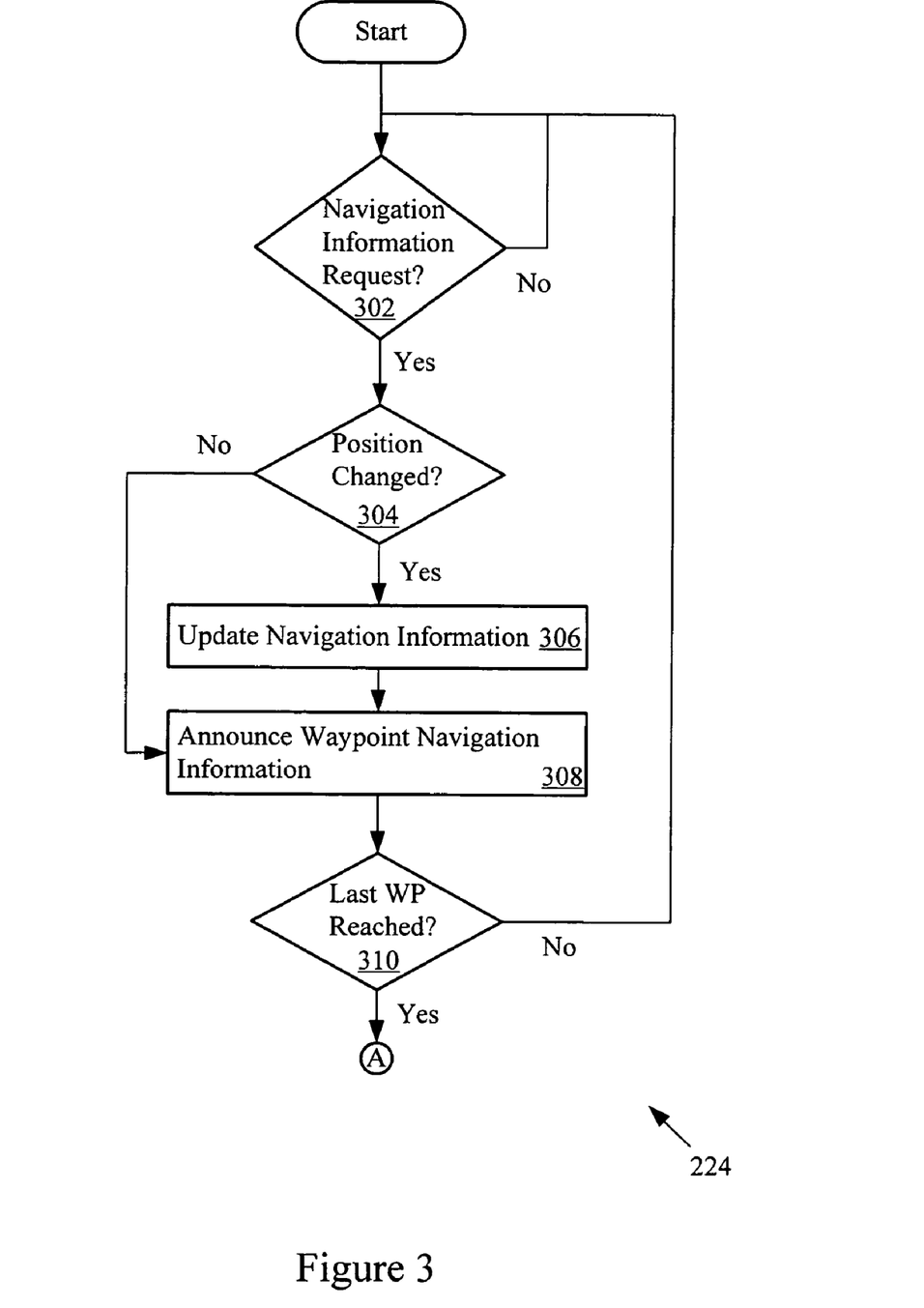
FIG. 3 is a flow diagram for providing on-request navigational information for an unmapped terrain.

In FIG. 3, the navigational system 100 may communicate the navigational information 128 to the operator acoustically in response to a request for information. The navigational information 128 may be selected according to the navigational preferences 130.

The process may begin with the navigational system 100 waiting to receive a request for navigational information from the operator (Act 302). The navigational system 100 may poll the operator interface 106 for a navigational request command, may receive an interrupt indicating that the operator has requested navigational information, or may determine that the operator has requested navigational information in another manner. The navigational system 100 may determine whether the current location 116 has changed since the last time that navigational information 128 was announced (Act 304).

If the current location 116 has changed, the navigational system 100 may update the navigational information 128 (Act 306). The navigational system 100 announces the navigational information 128 (Act 308). The navigational system 100 determines when the vehicle has reached the last waypoint (Act 310), and may announce that position when it is reached (Act 220). Otherwise, the navigational system 100 may maintain a wait state until additional navigational information requests are received.

The navigational system 100 may take other actions in addition to or instead of waiting for an operator's navigational requests. The navigational system 100 may, at any time, announce the navigational information while the vehicle is outside of or within the waypoint ranges at any time. The navigational system 100 may announce the navigational information periodically in time or space, or at predetermined intervals.

Figure 4:
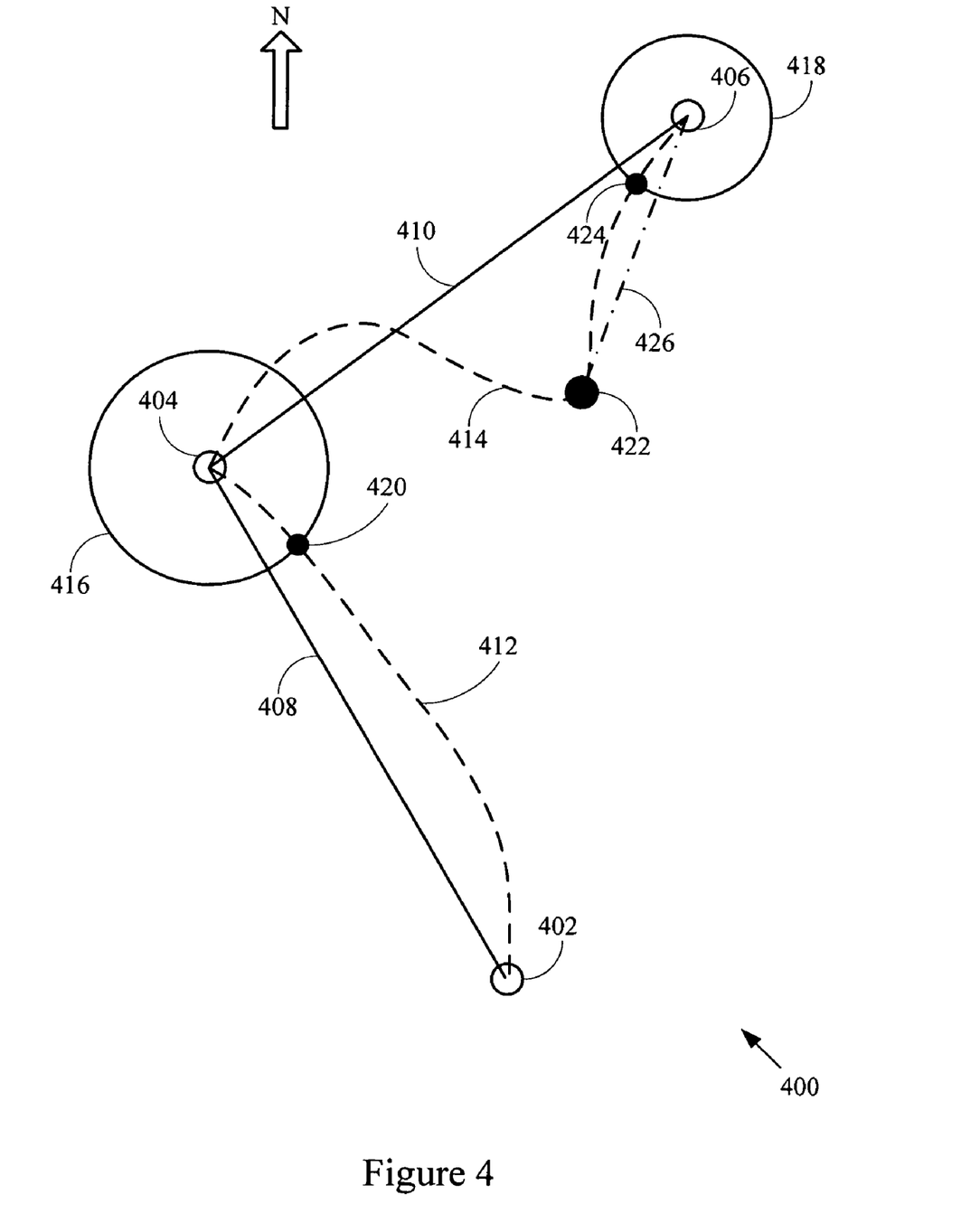
FIG. 4 is an unmapped terrain navigation through multiple waypoints.

In FIG. 4, an unmapped terrain navigation through multiple waypoints is shown. The waypoints may be located in the unmapped space 400 with a starting location designated 402, a first waypoint designated 404, and a second waypoint designated 406. The second waypoint 406 may be a destination. FIG. 4 further shows the shortest distance 408 between the starting location 402 and the first waypoint 404, as well as the shortest distance 410 between the first waypoint 404 and the second waypoint 406. Reference 412 indicates the path traveled by the vehicle between the starting location 402 and the first waypoint 404. Reference 414 indicates the path traveled by the vehicle between the first waypoint 404 and the second waypoint 406. The vehicle need not travel in a straight line between waypoints.

A first waypoint range 416 and a second waypoint range 418 show the distances from the first waypoint 404 and the second waypoint 406, which the navigational system 100 may announce the navigational information 128. Path points 420, 422, and 424 may represent selected locations along the vehicle paths 412 and 414. A shortest distance 426 between the path point 422 and the second waypoint 406 is shown.

In FIG. 4, the operator may enter the location information for the first and second waypoints 404 and 406 into the navigational system 100. Initially, the navigational system 100 may announce the vehicle's current location beginning with a starting location 402. A voice message such as "Waypoint 1 is 5 km to the Northwest." or another announcement may inform the operator of the geographic relationship between the vehicle and the first waypoint.

As the vehicle moves along the path 412, the vehicle approaches the first waypoint 404. When the vehicle reaches the path point 420, the current location 116 indicates that the vehicle is within the first waypoint range 416. The navigational system 100 may announce the navigational information 128 to the operator for the first waypoint 404. A voice message such as "Waypoint 1 is 0.4 km to the Northwest", "Waypoint 1 is 5 minutes ahead to the Northwest" or another announcement may inform an operator that the vehicle is proximate to the first waypoint 404. Time and distance measurements in a navigational message may be based on current or historical vehicle speed, past time and distance statistics, or on other information or characteristics.

As the vehicle reaches the first waypoint 404, the navigational system 100 may announce that the vehicle is at the first waypoint 404 and may announce navigational information for the second waypoint 406, that may include distance, direction, waypoint characteristics, or other navigational information. A voice message such as "You have reached waypoint 1, this is the last gas station before the destination. Waypoint 2 is at 70 km to your right in the direction Northeast" may be announced.

In this figure, when a vehicle reached the first waypoint, the navigational system 100 provides the operator with attribute information about the first waypoint (e.g., that the first waypoint is a gas station). The navigational system 100 may then determine that the vehicle has reached a waypoint when the vehicle comes within a predetermined distance of the waypoint (e.g., 100 m), when the vehicle is within a pre-selected arrival time (e.g., 20 seconds), or when the vehicle meets or exceeds another measurable parameter. The parameters that determine when the vehicle has reached a destination may differ.

In FIG. 4, a vehicle may move toward the second waypoint 406 along the path 414. At the path point 422, the shortest distance between the vehicle and the second waypoint 406 is indicated by reference 426. As shown by the path 414, the vehicle may deviate from a straight line path to the final waypoint. The navigational system 100 may retain deviation information in the memory 104 that may be conveyed to the operator as part of the navigational information 128.

The deviation information may include the difference in direction, distance, or time to reach a waypoint from a linear approach, or other deviation information. An operator request for navigational information may yield a straight line distance 426 to the next waypoint, or may yield an estimate to the second waypoint 406 based on the deviation information. In response to a request for navigational information, the navigational system 100 may respond that "Waypoint 2 is 700 m in front of you in a direction North by Northeast" or may convey any other acoustic message.

When the vehicle reaches the path point 424, the current location 116 indicates that the vehicle is within the second waypoint range 418. The navigational system 100 may respond by announcing navigational information 128 for the second waypoint 406. A voice message such as "Waypoint 2, your final destination, is 400 m to your right in the direction Northeast" may provide the navigational information to the operator. When the vehicle reaches the second waypoint 406, the navigational system 100 also may announce that the second waypoint 406 is the final waypoint and that the vehicle has reached its destination.

As the vehicle moves between waypoints to its destination, the navigational system 100 may track the vehicle positions over time and may store the positions as backtracking information 132. The positions may form a backtracking path. In returning to its starting location 402, the vehicle may follow the backtracking path. On the return trip, one or more of the vehicle positions on the backtracking path may be designated waypoints. The vehicle also may follow the backtracking path in a forward direction from the starting location 402 to a destination on a subsequent trip.

Figure 5:
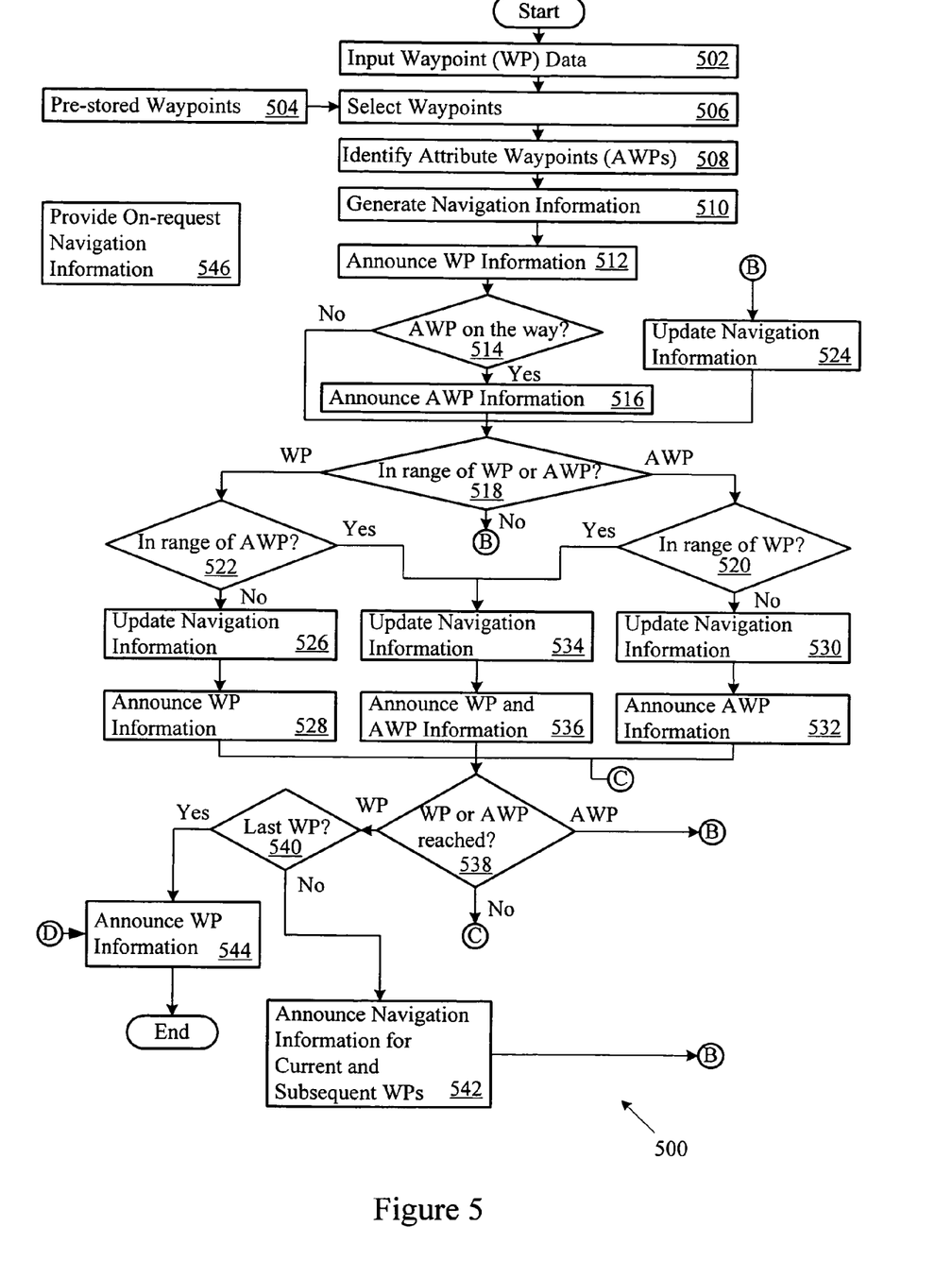
FIG. 5 is a second flow diagram of an unmapped terrain navigation.

FIG. 5 is a flow diagram 500 of a process that navigates unmapped terrain navigation through backtracking. In a backtracking navigation, a previously traveled track is traveled in a same or an opposite direction. The backtracking information 132 may provide the coordinate locations of back tracking waypoints through which the vehicle may travel along the backtracking path.

The operator may enter additional waypoint locations 114, waypoint data 118, navigational preferences 130, or other data (Act 502). The navigational system also may accept additional data such as pre-defined paths from a machine readable medium or another source (Act 506). The operator may select any of the backtracking waypoints from the backtracking information 132 or designate additional waypoints as path waypoints to travel through on the backtracking path (Act 506).

One or more of the waypoints may be attribute waypoints. An attribute waypoint may represent any location in space in which the operator has an interest, such as a geographical point of interest, a gas station, a sharp turn, or any other location. The attribute waypoints need not be located on the backtracking path. The operator may specify any number of attribute waypoints (Act 508) and may establish any corresponding waypoint attributes 120 and waypoint attribute preferences 124.

In a backtracking navigation, the distance from the vehicle to the next path waypoint or attribute waypoint may be determined in different ways. The distance may be determined through time, distance, or another measurable parameter along the established backtracking path. The distance also may be determined by processing a time, measuring a distance, or processing or measuring other parameters.

The navigational system 100 may generate navigational information 128 (Act 510). The navigational system 100 may make an initial announcement of waypoint navigational information 128 as the vehicle begins moving (Act 512). The navigational system 100 may also determine whether any attribute waypoints are on or within a selected distance in time or space of the backtracking path (Act 514). If attribute waypoints are on or near the backtracking path, or are between the current vehicle location and the next path waypoint, the navigational system may announce attribute waypoint navigational information, including distance, direction, attributes, or any other navigational information (Act 516).

As the vehicle moves, the navigational system maintains the current location 116 and determines when the vehicle is within range of a path waypoint or attribute waypoint (Act 518). When the vehicle is within range of an attribute waypoint, the navigational system 100 may also determine if the vehicle is within range of a path waypoint (Act 520). When the vehicle is within range of a path waypoint, the navigational system 100 also may determine if the vehicle is within range of an attribute waypoint (Act 522). When no path waypoint or attribute waypoint is within range, the navigational system 100 may continue to update its navigational information 128 (Act 524).

When the vehicle is within range of a path waypoint, the navigational system 100 may update the navigational information 128 (Act 526). The navigational system 100 may announce the navigational information 128 for the proximate path waypoint to the operator (Act 528). When the vehicle is within range of an attribute waypoint, the navigational system 100 may update the navigational information 128 (Act 530). The navigational system 100 may provide the navigational information 128 to the operator (Act 532). When the vehicle is within range of both a path waypoint and an attribute waypoint, the navigational system 100 may update the navigational information 128 (Act 534) and may provide the navigational information 128 for both proximate waypoints to the operator (Act 536).

The navigational system 100 also may determine when the vehicle has reached a path waypoint or an attribute waypoint (Act 538). When the proximate waypoint is an attribute waypoint, the navigational system 100 may continue to update the navigational information (Act 524), may maintain the current location 116, and may determine when the vehicle approaches other waypoints. When the proximate waypoint is a path waypoint, the navigational system 100 may determine whether the proximate path waypoint is a final waypoint (Act 540).

When the proximate waypoint is not the final waypoint, the navigational system 100 may announce that the vehicle has reached the proximate waypoint (Act 542). The navigational system 100 also may announce navigational information for a subsequent waypoint on the backtracking path. When the proximate waypoint is the final waypoint, the navigational system 100 may announce that the vehicle has reached its destination (Act 544).

Figure 6:
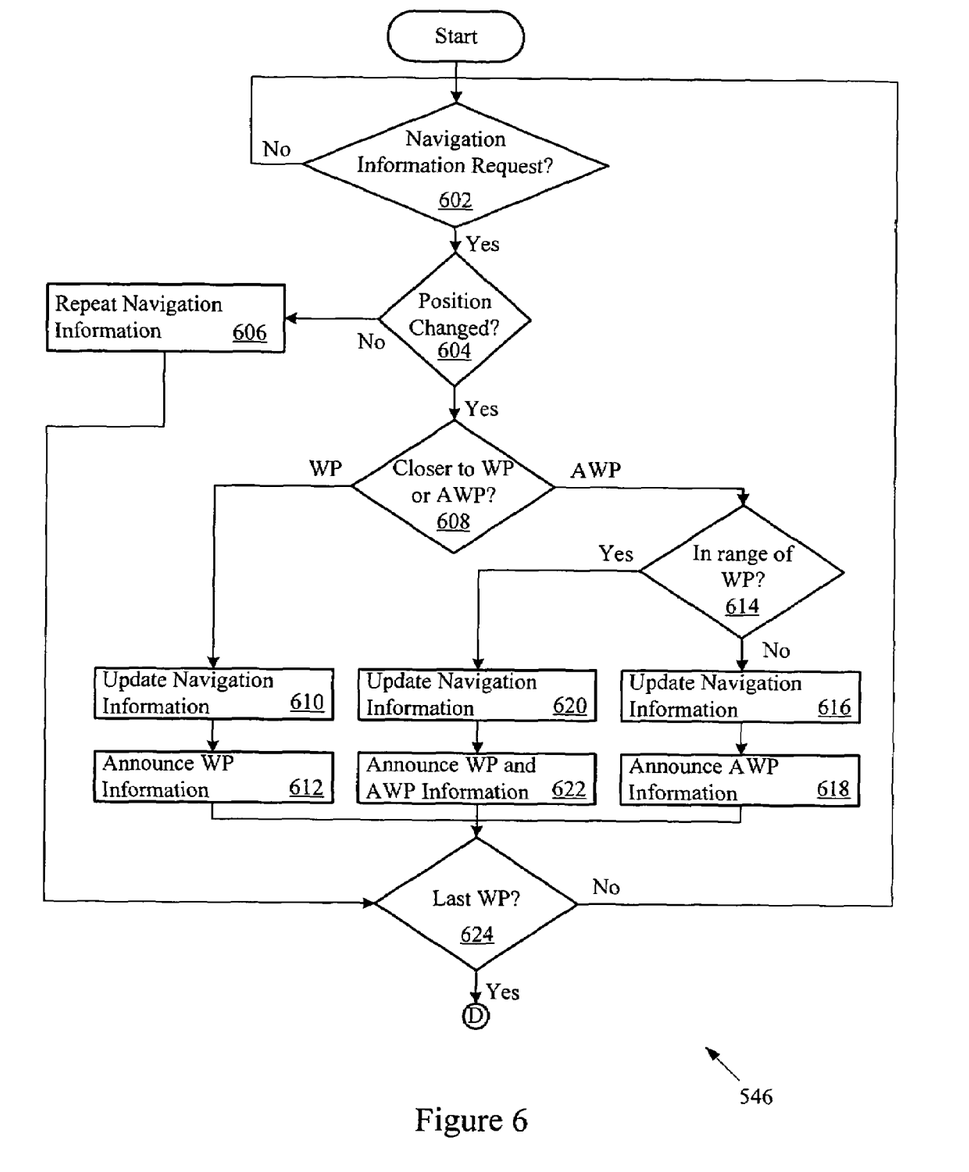
FIG. 6 is a second flow diagram for providing on-request navigational information for an unmapped terrain.

The navigational system 100 may respond to an operator's request for navigational information at any time (Act 546). FIG. 6 shows a flow diagram for a process for providing on-request navigational information. The process shown in FIG. 6 may be processed simultaneously with the process shown in FIG. 5.

In FIG. 6, the navigational system 100 may wait to receive a request for navigational information from the operator (Act 602). The navigational system 100 may determine whether the current location 116 has changed more than a threshold amount in time, space, or other measurable parameters since the last time that navigational information 128 was announced (Act 604). If the current location 116 has not changed, the navigational system may repeat a prior navigational information announcement (Act 606).

If the current location 116 has changed, the navigational system 100 may determine whether the vehicle has moved closer to any given path waypoint, including the next waypoint on the backtracking path (Act 608). When the vehicle has moved closer to a path waypoint, the navigational system 100 may update the navigational information 128 (Act 610) and announce the navigational information 128 to the operator (Act 612). The navigational system 100 may announce navigational information consistent with the navigational preferences 130 in the memory 104.

When the vehicle has moved closer to an attribute waypoint, the navigational system 100 also may determine whether the vehicle is within range of a path waypoint (Act 614). When the vehicle is not within range of a path waypoint, the navigational system 100 may update the navigational information 128 (Act 616) and announce the attribute waypoint navigational information (Act 618). When the vehicle is within range of a path waypoint, the navigational system 100 may update the navigational information 128 (Act 620) and announce the attribute waypoint navigational information and the path waypoint navigational information (Act 622).

The navigational system 100 may also determine whether the vehicle has reached the last path waypoint (Act 624). When the vehicle has arrived at the final waypoint, the navigational system 100 may announce that the vehicle has reached its destination (Act 544). Otherwise, the navigational system 100 may wait for additional navigational information requests.

The operator may make a specific navigational information request regardless of the content of the navigational preferences 130. The operator may specify that only path waypoint navigational information is of interest, or that only attribute waypoint navigational information is of interest, or may specify other limits or requests. The navigational system 100 may respond with the type of information requested by the operator.

Figure 7:
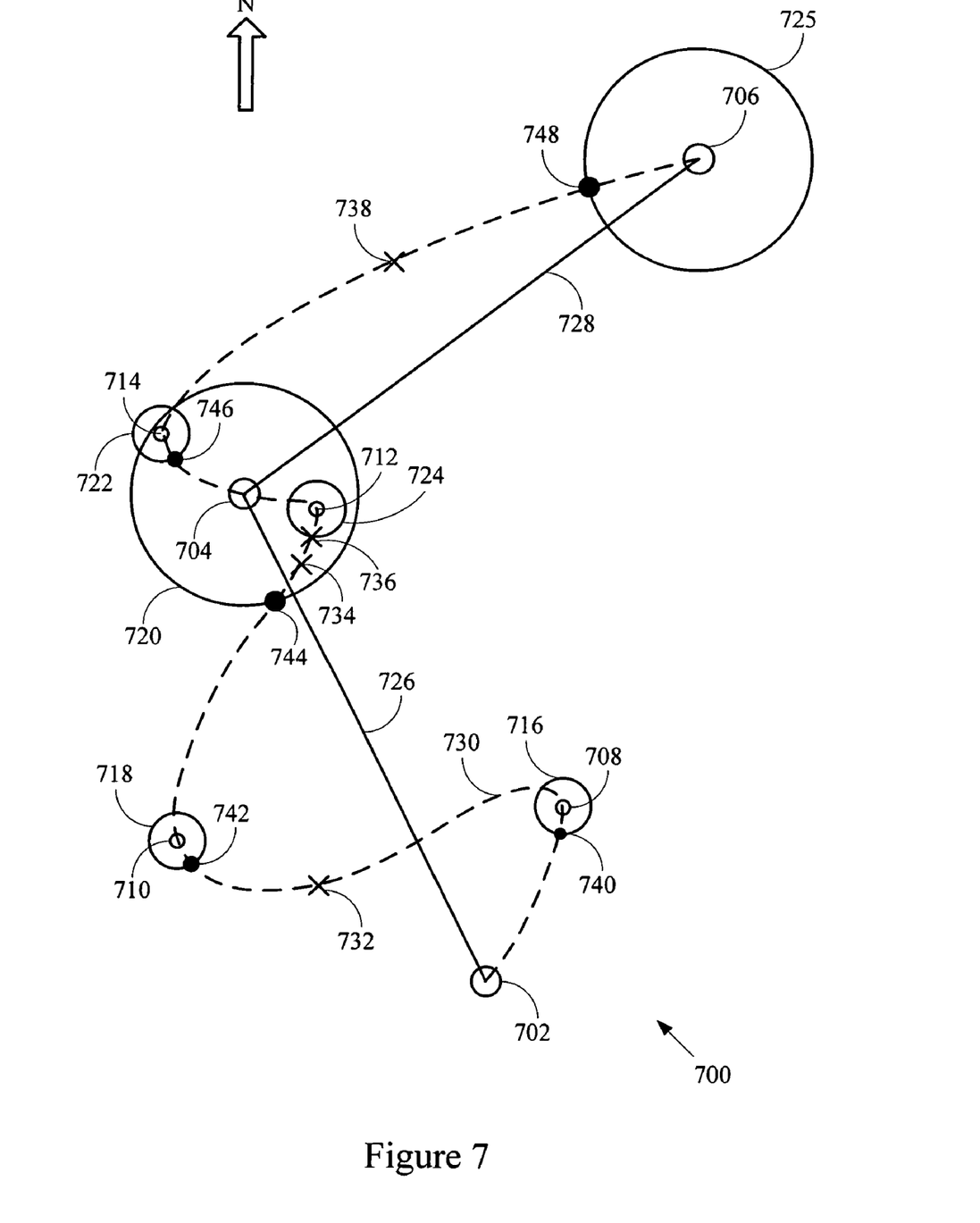
FIG. 7 is a second unmapped terrain navigation through multiple waypoints.

In FIG. 7, an unmapped terrain backtracking navigation through multiple waypoints is shown. The waypoints may be located in the unmapped space 700. FIG. 7 shows a starting location 702, a first path waypoint 704, and a second path waypoint 706. FIG. 7 also shows attribute waypoints 708, 710, 712, and 714. In this figure, the attribute waypoints 708-714 indicate the locations of sharp turns.

The waypoints 704-714 may be associated with waypoint ranges 716, 718, 720, 722, 724, and 725. The waypoint ranges 716-725 may represent distances in time or space. The distances may be determined along a straight line, or along a backtracking path.

FIG. 7 also shows the shortest distance 726 between the starting location 702 and the first waypoint 704, as well as the shortest distance 728 between the first waypoint 706 and the second waypoint 706. Reference numeral 730 indicates the backtracking path traveled by the vehicle between the starting location 702 and the waypoints 704-714. The vehicle operator may deviate from the backtracking path 730 to visit any other attribute waypoints.

The reference numerals 732, 734, 736, and 738 designate locations where the operator has requested navigational information. The operator may request navigational information at any location or time. Locations also are indicated in FIG. 7 by reference numerals 740, 742, 744, 746, and 748 where the vehicle has moved within range of a waypoint.

From the starting point 702, the vehicle may follow the backtracking path 730 to the first waypoint 704, then to the second (destination) waypoint 706. The navigational system 100 may analyze the waypoint data 118 to determine which waypoints are of interest to the operator. In FIG. 7, the navigational system 100 has identified the attribute waypoints 708-714 as locations where sharp turns may occur in path 730. The sharp turns may be identified by analyzing the topography of the backtracking path 730, by computing a derivative of the backtracking track 730, by reading waypoint attributes 120, or by any other manner.

Initially, the navigational system 100 may announce navigational information for the starting location 702 and the first waypoint 704. Between the starting location 702 and the first waypoint 704 are the attribute waypoints 708, 710, and 712. The navigational system 100 may also announce navigational information for the attribute waypoints 708, 710, 712. The announcements may take the form of a synthesized speech message such as "On your way to the first waypoint 20 km to the Northwest, a first special waypoint is present 3 km in the direction North by Northeast." or another message.

The vehicle follows the backtracking path 730, and may not travel across a shortest path toward the next waypoint. The navigational system 100 may announce the distance to the next waypoint along the backtracking path 730. In FIG. 7, the vehicle follows the backtracking path 730 toward the first attribute waypoint 708.

The circle shown around attribute waypoint 708 may indicate the waypoint range 716 at which the navigational system 100 may announce navigational information concerning this attribute waypoint. The waypoint ranges may be expressed as a shortest distance from the current location 116 to a waypoint. The waypoint ranges may alternatively or additionally be expressed as distances or times along the backtracking path 730 to a waypoint.

When the vehicle arrives at path point 740, the navigational system may deliver the navigational message. The message may indicate that "The first attribute waypoint is 400 m in front of you in the direction North by Northeast. The first attribute waypoint is a sharp turn to the left toward the second attribute waypoint that lies 10 km to the West" or may convey any other information. The navigational system 100 may refrain from delivering navigational information for the first path waypoint 704 until the vehicle is closer to the first path waypoint 704.

As the vehicle travels toward the second attribute waypoint 710, the operator requests navigational information at location 732. The navigational system 100 may respond with an appropriate navigational message. The navigational message may relate that "The second attribute waypoint is 3 km in the direction West by Northwest."

When the vehicle reaches the path point 742, its current location is within the attribute waypoint range 718. The navigational system 100 may respond by announcing a navigational message about the second attribute waypoint. The navigational message may indicate a sharp turn to the right, or any other navigational information.

At the path point 744, the vehicle's current location is within the waypoint range 720. The navigational system 100 may announce navigational information for the first waypoint 704. The attribute waypoint 712 may be located on the backtracking path 730 to the first waypoint 603. The navigational system 100 also may announce navigational information for the attribute waypoint 712. The navigational information may specify "On your way to waypoint 1, which 2 km distant, you pass the third attribute waypoint, currently 1.5 km distant in the direction North by Northeast" or may specify other navigational information.

At the path point 734, the operator may again request navigational information. The navigational system 100 may respond by providing navigational information concerning the third attribute waypoint 712 as well as the first path waypoint 704. At the path point 736, the current location 116 may be within the waypoint range 724 of the third attribute waypoint 712 and also within the waypoint range of the first path waypoint 704. The navigational system 100 may announce navigational information for both the attribute waypoint 712 and the path waypoint 704.

When the vehicle reaches the first path waypoint 704, the navigational system 100 may generate another announcement containing navigational information. The navigational information may indicate that the vehicle has reached the first path waypoint 704, or may include information about the path waypoint 704 itself. The navigational information may also include navigational information related to a subsequent path waypoint, including the second path waypoint 706, and navigational information concerning the fourth attribute waypoint 714.

At the path point 746, the vehicle may move within the attribute waypoint range 722 of the fourth attribute waypoint 714. The operator may receive navigational information from the navigational system 100 concerning the fourth attribute waypoint 714. After passing the attribute waypoint 714, the vehicle may turn to the right in the direction of the destination waypoint 706.

At the path point 738, the operator may request additional navigational information. The navigational system 100 may respond by updating the navigational information 128 and announcing the navigational information 128 to the operator. In this example, the navigational information may indicate that "Waypoint 2, the final destination, is 5 km in front of you in the direction East by Northeast."

At path point 748, the vehicle may be within the path waypoint range 725 of the second path waypoint 706. The navigational system 100 may determine that the vehicle has moved within range of the second path waypoint 706 and provide a navigational information announcement. The navigational information announcement may indicate that "Waypoint 2, the final destination, is 500 m ahead of you in the direction East by Northeast." When the vehicle arrives at the second path waypoint 706, the navigational system 100 may deliver the navigational message "You have reached the final destination. The hotel can be found to your right." or any other navigational message for the second path waypoint 706.

FIG. 7 shows that the vehicle approximately follows the backtracking path 730. The vehicle may deviate from the backtracking path 730. The navigational system may also deliver a navigational message to the operator about the deviation, such as "The deviation from the path is 200 m. To return to the path please turn to the right" or any other message.

In the absence of digitized road information the navigational system 100 may determine navigational information based on the current location 116 of the vehicle and the specified waypoints. The navigational system 100 may provide the navigational information audibly or using text or graphics using the communication logic 108. The operator need not divert attention from traffic or other road conditions and may instead listen to or look through navigational information while visually concentrating on vehicle guidance.

The text or graphics may be shown through a heads-up-display or "HUD." A heads-up-display may be a display shown on any item an operator may ordinarily look at, such as a windshield, visor, eye protection (e.g., sunglasses), or other items. The text or graphics also may be scanned or painted directly onto the operator's retina using light sources such as semiconductor lasers or light emitting diodes. The scanned text or graphics may overlay the operator's view of real world traffic and road conditions and may convey the navigational information without diverting the operator's attention from the road.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for vehicle navigation, comprising:
   establishing path waypoints in an unmapped space in a navigational system;
   automatically tracking vehicle positions between the path waypoints in the unmapped space over time as the vehicle moves through the unmapped space;
   automatically storing the vehicle positions between the path waypoints in a memory; and
   automatically establishing a backtracking path through the unmapped space through the vehicle positions between the path waypoints stored in the memory.

2. The method of claim 1, further comprising:
   establishing a first path waypoint range;
   establishing a current position in the unmapped space; and
   communicating navigation information when the current position is within the first path waypoint range.

3. The method of claim 2, further comprising the act of:
   establishing a subsequent path waypoint into the navigational system, and where communicating comprises communicating navigational information for the subsequent path waypoint.

4. The method of claim 1, further comprising:
   establishing an attribute waypoint in the navigational system;
   establishing a current position in the unmapped space;
   generating navigational information for the attribute waypoint based on the current position; and
   communicating the navigational information for the attribute waypoint.

5. The method of claim 4, further comprising:
   establishing an attribute waypoint range,
   and where the act of communicating the navigational information for the attribute waypoint occurs when the current position is within the attribute waypoint range.

6. The method of claim 1, further comprising:
   accepting a request for navigational information; and
   communicating in response to the request.

7. The method of claim 1, further comprising:
   generating navigational information comprising current position data or distance data or direction data or deviation data or estimated time of arrival data or waypoint attribute data, or any combination thereof; and
   communicating the navigation information.

8. The method of claim 2, further comprising the act of determining when the current position is within the first path waypoint range based on a shortest distance metric.

9. The method of claim 2, further comprising the act of determining when the current position is within the first path waypoint range based on a pre-determined path.

10. The method of claim 5, further comprising:
establishing a first path waypoint in unmapped space the navigation system;
establishing a first path waypoint range;
communicating the navigational information for the first path waypoint and not the navigational information for the attribute waypoint when the current position is within the first path waypoint range and outside the attribute waypoint range;
communicating the navigational information for the attribute waypoint and not the navigational information for the first path waypoint when the current position is outside the first path waypoint range and within the attribute waypoint range; and
communicating both the navigational information for the first path waypoint and the navigational information for the attribute waypoint when the current position is within the first path waypoint range and within the attribute waypoint range.

11. A navigational system comprising:
position data stored in a memory comprising a current position in an unmapped space and a first path waypoint positions for path waypoints in an unmapped space;
vehicle positions between the path waypoints in the unmapped space automatically stored in the memory over time as the vehicle moves through the unmapped space; and
a backtracking path automatically established through the unmapped space through the vehicle positions between the path waypoints stored in the memory.

12. The navigational system of claim 11, further comprising communication logic that communicates navigation information for one or more of the path waypoints, where the communication logic comprises a voice synthesizer.

13. The navigational system of claim 11, further comprising range data stored in the memory comprising a first path waypoint range corresponding to a first path waypoint.

14. The navigational system of claim 13, further comprising communication logic that communicates the navigational information for the first path waypoint when the current position is within the first path waypoint range.

15. The navigational system of claim 13, where the range data comprises multiple path waypoint ranges including the first path waypoint range.

16. The navigational system of claim 15, further comprising communication logic that communicates navigational information for a selected path waypoint in the path waypoints when the current position is within a path waypoint range in the multiple path waypoint ranges associated with the selected path waypoint.

17. The navigational system of claim 11, further comprising waypoint attribute data for an attribute waypoint and an attribute waypoint range associated with the attribute waypoint.

18. The navigational system of claim 17, further comprising communication logic that communicates navigational information for the attribute waypoint when the current position is within the attribute waypoint range.

19. The navigational system of claim 11, further comprising an operator input for accepting an on-request navigation input.

20. A computer readable medium encoded with instructions that cause a navigational system to perform a method comprising the acts of:
establishing path waypoints in an unmapped space in a navigational system;
automatically tracking vehicle positions between the path waypoints in the unmapped space over time as the vehicle moves through the unmapped space;
automatically storing the vehicle positions between the path waypoints in a memory; and
automatically establishing a backtracking path through the unmapped space through the vehicle positions between the path waypoints stored in the memory.

21. The computer readable medium of claim 20, further comprising:
establishing a current position in the unmapped space;
establishing a first path waypoint range; and
communicating navigation information when the current position is within the first path waypoint range.

22. The computer readable medium of claim 20, further comprising:
establishing a current position in the unmapped space;
establishing an attribute waypoint in the navigational system;
generating navigational information for the attribute waypoint based on the current position; and
communicating the navigational information for the attribute waypoint.

23. The computer readable medium of claim 22, further comprising:
establishing an attribute waypoint range for the attribute waypoint; and
communicating the navigational information for the attribute waypoint when the current position is within the attribute waypoint range.

24. The computer readable medium of claim 21, further comprising determining whether the current position is within the first path waypoint range based on a time metric or a distance metric, or both.

25. The computer readable medium of claim 23, further comprising determining whether the current position is within the attribute waypoint range based on a time metric or a distance metric, or both.

26. A computer readable medium encoded with instructions that cause a navigational system to perform a method comprising the acts of:
establishing a vehicle path comprising multiple path waypoints in unmapped space;
establishing attribute waypoint data for multiple attribute waypoints in the unmapped space;
establishing attribute waypoint preferences;
establishing a current position in the unmapped space;
determining a distance from the current position to the multiple attribute waypoints and the multiple path waypoints;
generating navigational information for a proximate attribute waypoint of the multiple attribute waypoints and communicating the navigational information for the proximate attribute waypoint when the distance from the current position to the proximate attribute waypoint is within a range of the proximate attribute waypoint that matches the attribute waypoint preferences;

generating navigational information for a proximate path waypoint of the multiple path waypoints and communicating the navigational information for the proximate path waypoint when the distance from the current position to the proximate path waypoint is within a range of the proximate path waypoint;

automatically tracking vehicle positions between the multiple path waypoints in the unmapped space over time as the vehicle moves through the unmapped space;

automatically storing the vehicle positions between the multiple path waypoints in a memory; and automatically establishing a backtracking path through the unmapped space through the vehicle positions between the multiple path waypoints stored in the memory.

27. The computer readable medium of claim 26, where the attribute waypoint preferences are vehicle operator preferences for waypoints of interest.

28. The computer readable medium of claim 26, where the distance is a vehicle path distance.

29. The computer readable medium of claim 26, communicating the navigational information for the proximate path waypoint comprises communicating additional navigational information for a subsequent path waypoint of the multiple path waypoints.

30. The computer readable medium of claim 26, where the navigational information for the proximate attribute waypoint or the navigational information for the proximate path waypoint comprises current position data or distance data or direction data or deviation data or estimated time of arrival data or waypoint attribute data.

31. A navigational system comprising:
an operator interface;
acoustic communication logic;
a memory comprising:
  position data stored comprising a path waypoint positions corresponding to path waypoints in an unmapped space;
  vehicle positions between the path waypoints in the unmapped space automatically stored in the memory over time as the vehicle moves through the unmapped space; and
  a backtracking path automatically established through the unmapped space through the vehicle positions between the path waypoints; and
a processor coupled to the memory, the acoustic communication logic, and the operator interface, the processor operable to communicate navigational information for the path waypoints through the acoustic communication logic.

32. The navigational system of claim 31, where the memory further comprises waypoint range data.

33. The navigational system of claim 32, where the waypoint range data comprises path waypoint range data.

34. The navigational system of claim 32, where the waypoint range data comprises attribute waypoint range data.

35. The navigational system of claim 33, the position data further comprising a current position in the unmapped space, where the waypoint range data comprises a first path waypoint range corresponding to a first path waypoint, and where the processor communicates navigational information for the first path waypoint when the current position is within the first path waypoint range.

36. The navigational system of claim 31, where the memory further comprises waypoint attributes and waypoint attribute preferences selected from the waypoint attributes.

* * * * *